(12) United States Patent
Jordan et al.

(10) Patent No.: US 6,282,976 B1
(45) Date of Patent: Sep. 4, 2001

(54) DISCONTINUOUS MECHANICAL ADVANTAGE FRONT SHIFTING FOR BICYCLES

(75) Inventors: Brian T. Jordan; John D. Cheever, both of Chicago, IL (US)

(73) Assignee: SRAM Corporation, Chicago, IL (US)

(*) Notice: Subject to any disclaimer, the term of this patent is extended or adjusted under 35 U.S.C. 154(b) by 0 days.

(21) Appl. No.: 09/380,054

(22) PCT Filed: Feb. 19, 1998

(86) PCT No.: PCT/US98/03230

§ 371 Date: Aug. 20, 1999

§ 102(e) Date: Aug. 20, 1999

(87) PCT Pub. No.: WO98/37340

PCT Pub. Date: Aug. 27, 1998

Related U.S. Application Data

(60) Provisional application No. 60/038,667, filed on Feb. 20, 1997.

(51) Int. Cl.[7] .............................. G05G 13/00; F16C 1/10; F16H 59/00
(52) U.S. Cl. .............................. 74/489; 74/502.2; 474/82
(58) Field of Search .............................. 474/80, 82, 129, 474/127, 128; 74/506, 502.2, 517, 489, 551.9, 473.13, 502.6, 488, 516, 518, 519

(56) References Cited

U.S. PATENT DOCUMENTS

| | | | |
|---|---|---|---|
| 3,938,407 | * 2/1976 | Nisbet | 74/516 |
| 4,470,823 | * 9/1984 | Shimano | 474/82 |
| 5,476,019 | * 12/1995 | Cheever et al. | 74/489 X |
| 5,620,383 | * 4/1997 | Patterson et al. | 474/80 |
| 5,797,296 | * 8/1998 | Ozaki | 74/502.2 X |
| 5,799,541 | * 9/1998 | Arbeiter | 74/489 |
| 5,802,927 | * 9/1998 | Yu et al. | 74/489 X |
| 5,816,966 | * 10/1998 | Yang et al. | 474/82 |
| 5,857,387 | * 1/1999 | Larson et al. | 74/551.9 |

* cited by examiner

*Primary Examiner*—David A. Bucci
*Assistant Examiner*—Marcus Charles
(74) *Attorney, Agent, or Firm*—Milan Milosevic; Jefferson Perkins; Piper Marbury Rudnick & Wolfe

(57) ABSTRACT

A rotatable handgrip twistshifter (10) mountable coaxially about a bicycle handlebar (20) that abruptly or discontinuously increases the mechanical advantage when shifting a front derailleur from a smaller to a larger chainring. A control cable (86) is slidably connected to the handgrip (12) such that during rotation of the handgrip (12) to effect gear shifts from the middle to larger chainrings of a triple chainring crankshaft (40, 41, 42), the cable (86) is abruptly dropped toward the handgrip axis of rotation thereby increasing the mechanical advantage or leverage of the shifter (10). Alternatively, the control cable (86) is slidably connected to the pivot arm (114) of a front derailleur such that during rotation of the handgrip (12) the cable (86) is deflected away from the derailleur pivot axis (207), likewise, increasing the mechanical advantage of the derailleur.

24 Claims, 9 Drawing Sheets

DISCONTINUOUS MECHANICAL ADVANTAGE FRONT SHIFTING FOR BICYCLES

RELATED APPLICATIONS

This application Claims priority to U.S. Provisional Application Ser. No. 60/038,667 filed Feb. 20, 1997.

TECHNICAL FIELD OF THE INVENTION

This invention relates in general to cable-actuated shifters for multiple-speed bicycles, and more particularly to shifters exhibiting varying mechanical advantage.

BACKGROUND OF THE INVENTION

Bicycle shifting systems comprise an actuating assembly or shifter operatively connected by a control cable within a housing to a responding assembly or derailleur. Actuation of the shifter by a rider causes the derailleur to urge a drive chain between various sprockets of a freewheel at the rear derailleur or chainrings at the front derailleur thereby effecting a gear shift. The present invention is an improvement both to shifters and front derailleurs.

Bicycle shifters can broadly be classified as lever shifters and rotatable twistshifters, each offering distinct methods of shift actuation for riders. Lever shifters, generally mounted on the bicycle frame down tube, handlebar stem or the handlebar itself, are characterized by a pivoting motion during actuation. Twistshifters, on the other hand, coaxially mounted about the handlebar, are characterized by a rotating motion substantially about the central axis of the handlebar.

Lever shifters can be further classified as conventional down tube or stem mounted shifters, thumbshifters and "push-pull" or "trigger" type shifters. Conventional lever shifters are actuated by clasping the lever between the thumb and index finger and pivoting the lever forward or backward to respectively pull or release the control cable. Thumbshifters, more conveniently mounted above the handlebar near the rider's hand, are actuated by using the thumb to nudge the pivoting lever forward or backward to the desired gear. Finally, "trigger" type shifters, likewise mounted near the rider's hand but generally below the handlebar, comprise a pair of independent levers forming an acute angle about a common pivot point, one lever being pulled by the index finger to move the drive chain from a large to a smaller sprocket, the second lever being pushed by the thumb to move the chain from a small to a larger sprocket.

One common feature of all lever shifters, however, is the need for the rider to remove at least one finger from the handlebar grip during gear shifts. This can create a potentially hazardous riding situation particularly in high performance bicycling, such as off-road mountain biking.

Rotatable twistshifters eliminate this potential riding hazard by allowing the rider to maintain a full fingered grip on the handlebar during all gear shifts. Twistshifters, generally located immediately inboard of the handlebar stationary grip, are actuated by simply rotating the shifter grip surface about the handlebar to the desired gear shift position. The present invention is in part an improvement to rotational twistshifters.

As noted above, the shifter is operatively connected by a control cable to a derailleur. Typically, a mountain bike uses a triple chainring setup including small, middle and large chainrings. In operation, the shift from the middle to large chainrings requires extra shifting force at the front derailleur, and in turn extra input torque by the rider at the shifter to effect a gear shift as compared to a gear shift from the small to middle chainrings. This extra shifting effort can be eliminated by including a mechanism in the shifter or on the front derailleur itself that discontinuously varies the mechanical advantage or "leverage" of the shifting system, thereby making the shift from the middle to large chainrings as effortless for the rider as the shift from the small to middle chainrings.

Known prior art brake lever systems incorporate similar leverage varying mechanisms to generate an increased brake cable force or braking power. A conventional brake lever assembly consists of a brake lever and a transverse mounting arm. The mounting arm is pivotally connected to a mounting bracket, the mounting bracket fixedly secured to a bicycle handlebar. The brake cable is attached to the mounting arm a select distance from the pivot point known as the "pivot arm." As the lever is squeezed by a rider, the mounting arm pivots, increasing the tension on the brake cable, thereby actuating the brake mechanism.

Said leverage varying brake lever systems, however, provide a slot in the mounting arm whereby the point of attachment of the brake cable is allowed to transition between the slot end locations which are at different distances from the pivot point. During the initial deflection of the brake lever, the cable attachment point is furthest from the pivot point, thereby providing minimal mechanical advantage. As the brake lever is further rotated, the cable attachment point slides along the slot toward the pivot point, thereby increasing the mechanical advantage and the overall braking power.

Although the noted braking device provides increased mechanical advantage, it suffers from several drawbacks. The most significant of these is the abrupt transition in mechanical advantage and hence, the force applied to the brake cable as the cable end is suddenly shifted along the slot. This abrupt increase in the cable force and resulting increase in clamping force at the wheel produces undesirable and, in many instances, hazardous braking characteristics. Accordingly, improved brake lever systems eliminate this braking hazard by altering the brake lever configuration and employing a fixed cable attachment point to achieve a substantially uniformly varying mechanical advantage without the use of slotted mechanisms.

Whereas, the brake lever systems have "taught away" from the use of abruptly varying or discontinuous mechanical advantage actuation systems to avoid hazardous braking conditions, the present invention specifically employs an abruptly varying mechanical advantage actuation system to reduce the input torque required to effect gear shifts from the middle to large chainrings.

SUMMARY OF THE INVENTIONS

It is an object of the present invention to provide a gear shilling system comprising a shift actuator and gear change device that abruptly or discontinuously varies the mechanical advantage or leverage of the system in response to the reciprocal rotation of the shift actuator.

It is a further object of this invention to provide a rotatable twistshifter that discontinuously increases the mechanical advantage during gear shills at the front derailleur from a smaller to a larger chainring. It is a further object of this invention to provide a front derailleur that discontinuously increases the mechanical advantage during gear shifts at the front derailleur from a smaller to a larger chaining.

According to this invention, a rotatable twistshifter, which is received over a handlebar, is provided in which the mechanical advantage is abruptly increased during gear shifts from the middle to larger chainrings of a triple chainring crankset. In a first embodiment of this invention, the cable actuating twistshifter includes a housing secured relative to the handlebar, a handgrip rotatable about an axis of rotation coaxial to the handlebar axis and a control cable slidably connected to the handgrip at a first end and to the front derailleur at its other end. As the handgrip is rotated to effect a gear shift at the front derailleur from the middle to larger chainrings, the cable end tied to the handgrip slides along a substantially radial slot toward the handgrip axis of rotation to increase the leverage of the rider to substantially level off the required input torque for shifts from the smaller to the middle and to the larger chainrings.

In an additional embodiment of the invention, the control cable is slidably attached to the front derailleur pivot arm such that during shifts from the middle to larger chainrings the control cable is deflected away from the derailleur pivot axis, likewise increasing the mechanical advantage and reducing the required rider input torque.

BRIEF DESCRIPTION OF THE DRAWINGS

Further aspects of the invention will be discerned in the following detailed descriptions when taken in conjunction with the drawings, in which like characters denote like parts and in which.

DETAILED DESCRIPTION OF THE INVENTION

Figure 1:
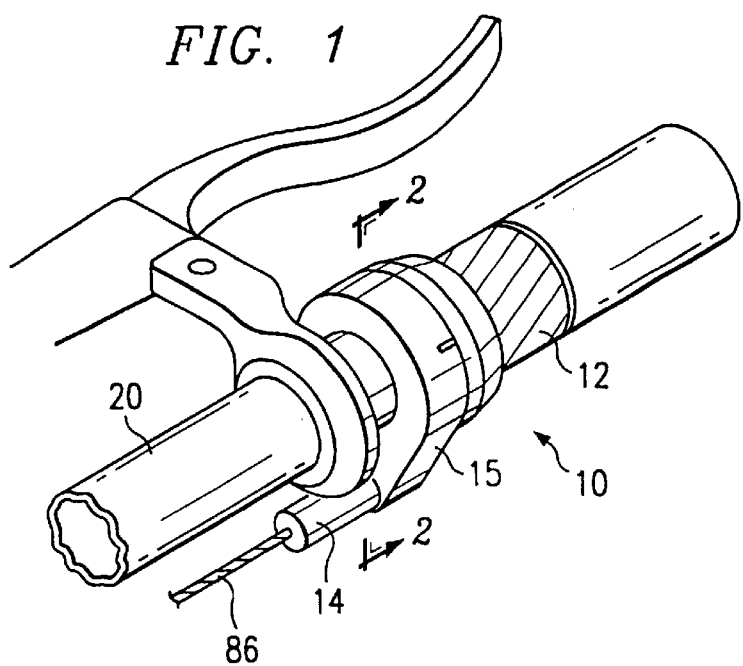
FIG. 1 is a isometric view of a twistshifter employing the invention.
Figure 2:
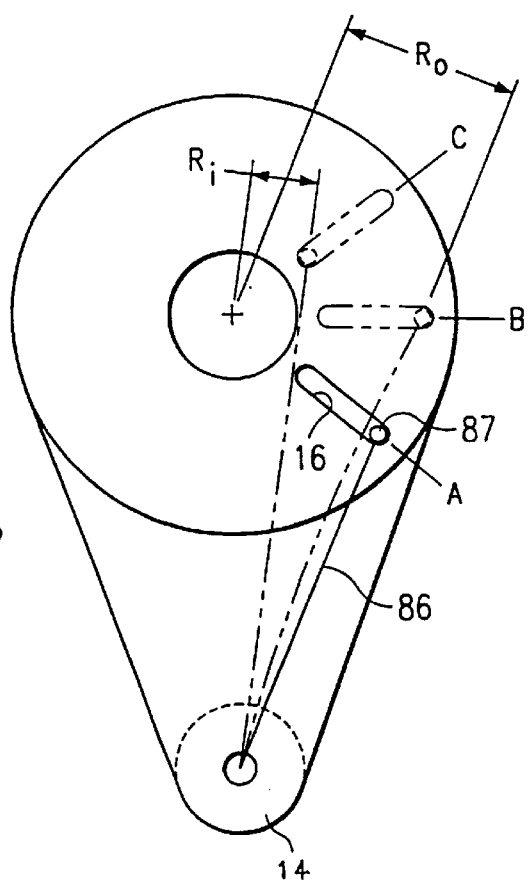
FIG. 2 is a sectional view taken substantially along line 2—2 of FIG. 1.

FIG. 1 is an isometric view of a rotational twistshifter 10 as installed on a bicycle handlebar 20. Rotation of a handgrip surface 12 by a rider's hand actuates control cable 86 thereby effecting gear shifts between the chainrings of a derailleur. FIG. 2 is a section view taken substantially along line 2—2 of FIG. 1 wherein the control cable 86 is guided through a noodle 14 and housing 15, with cable end 87 seated within slot 16, slot 16 rotating in response to a rider's rotation of handgrip 12. Handgrip 12 rotates around an axis which is substantially coaxial with the handlebar 20.

Figure 3:
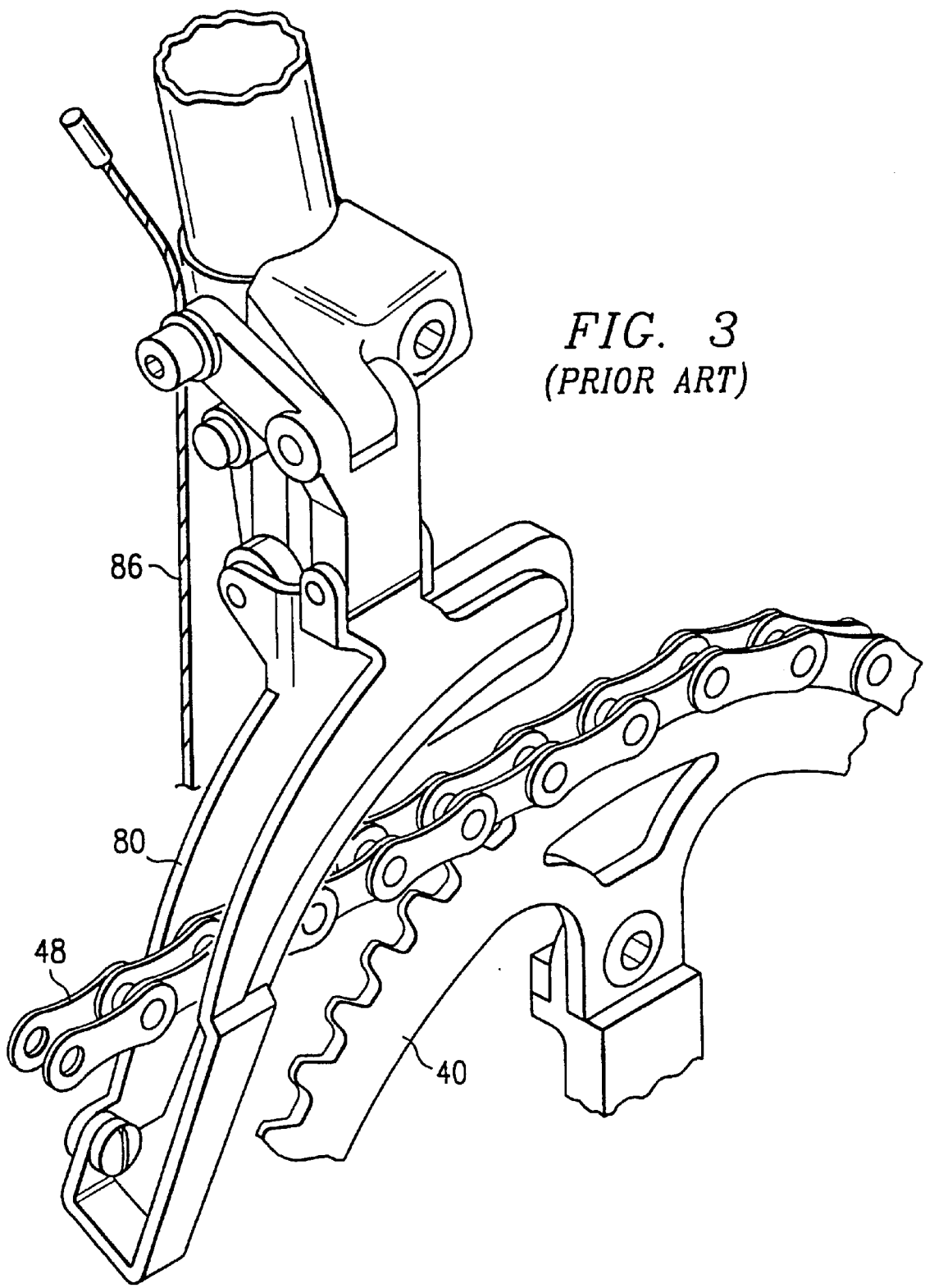
FIG. 3 is a isometric view of a front derailleur according to the prior art.
Figure 4A:
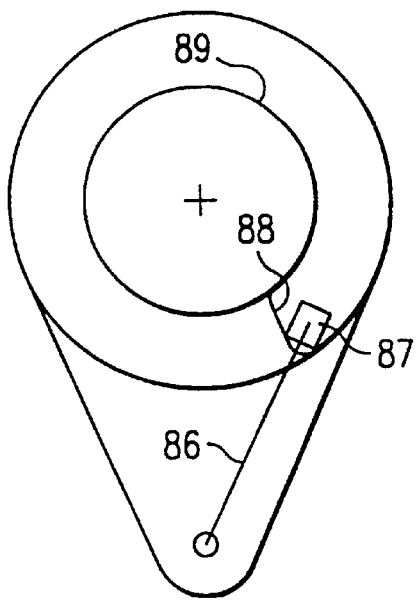
FIGS. 4a–d are sectional views showing successive stages in an operation of a twistshifter employing the invention.
Figure 4B:
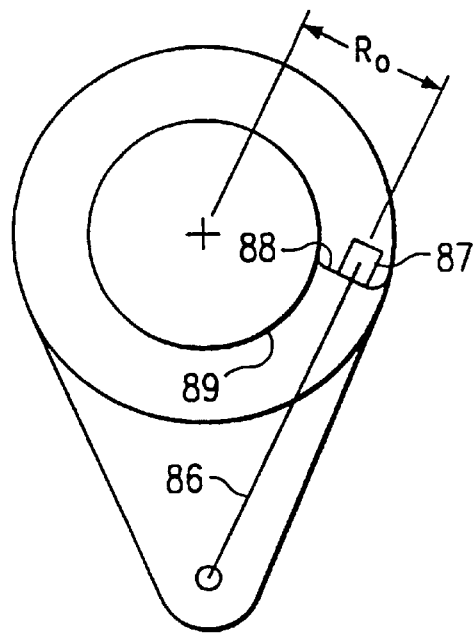
Figure 4C:
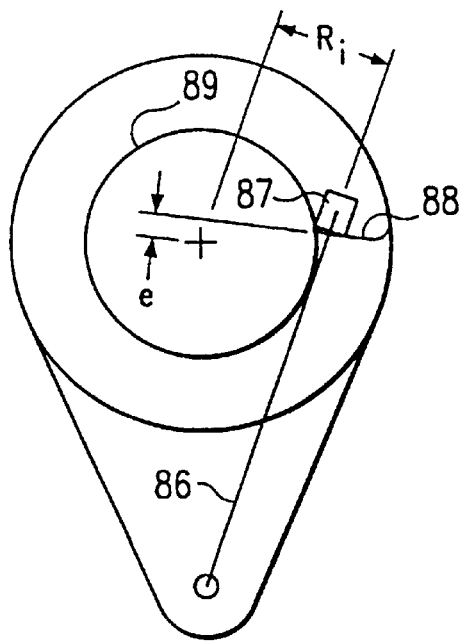
Figure 4D:
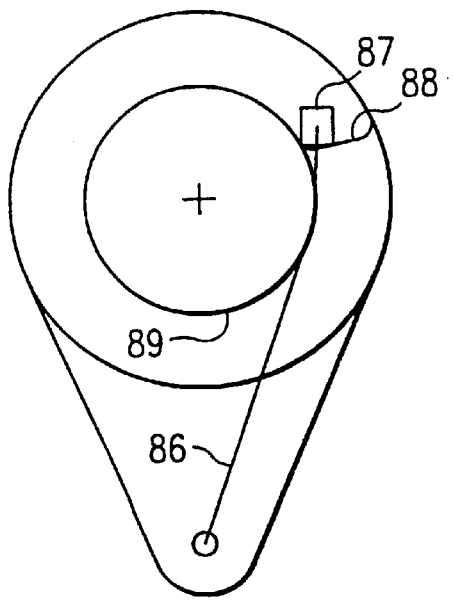
Figure 7:
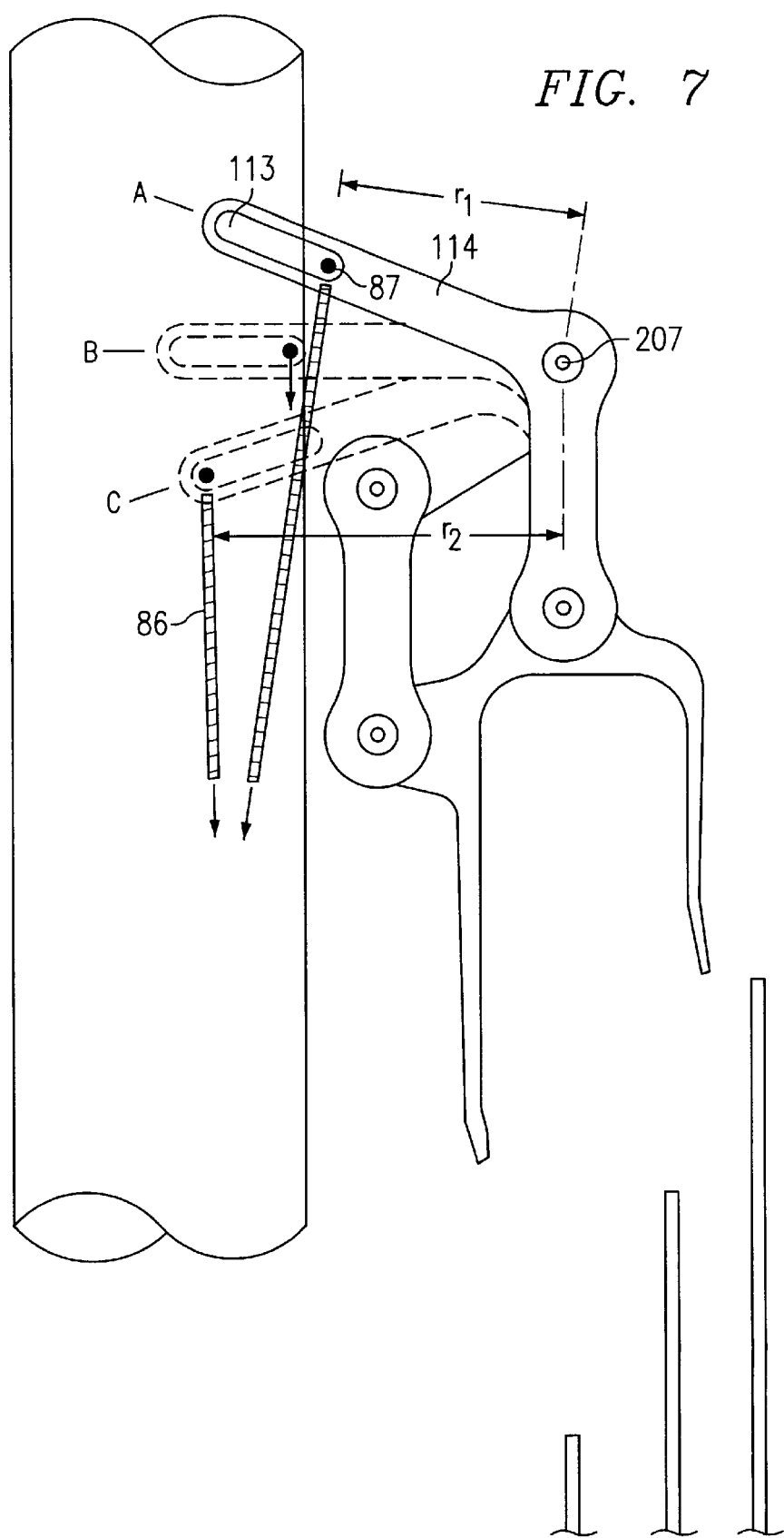
FIG. 7 is an elevational view of a front derailleur incorporating a fourth embodiment of the invention.
Figure 7A:
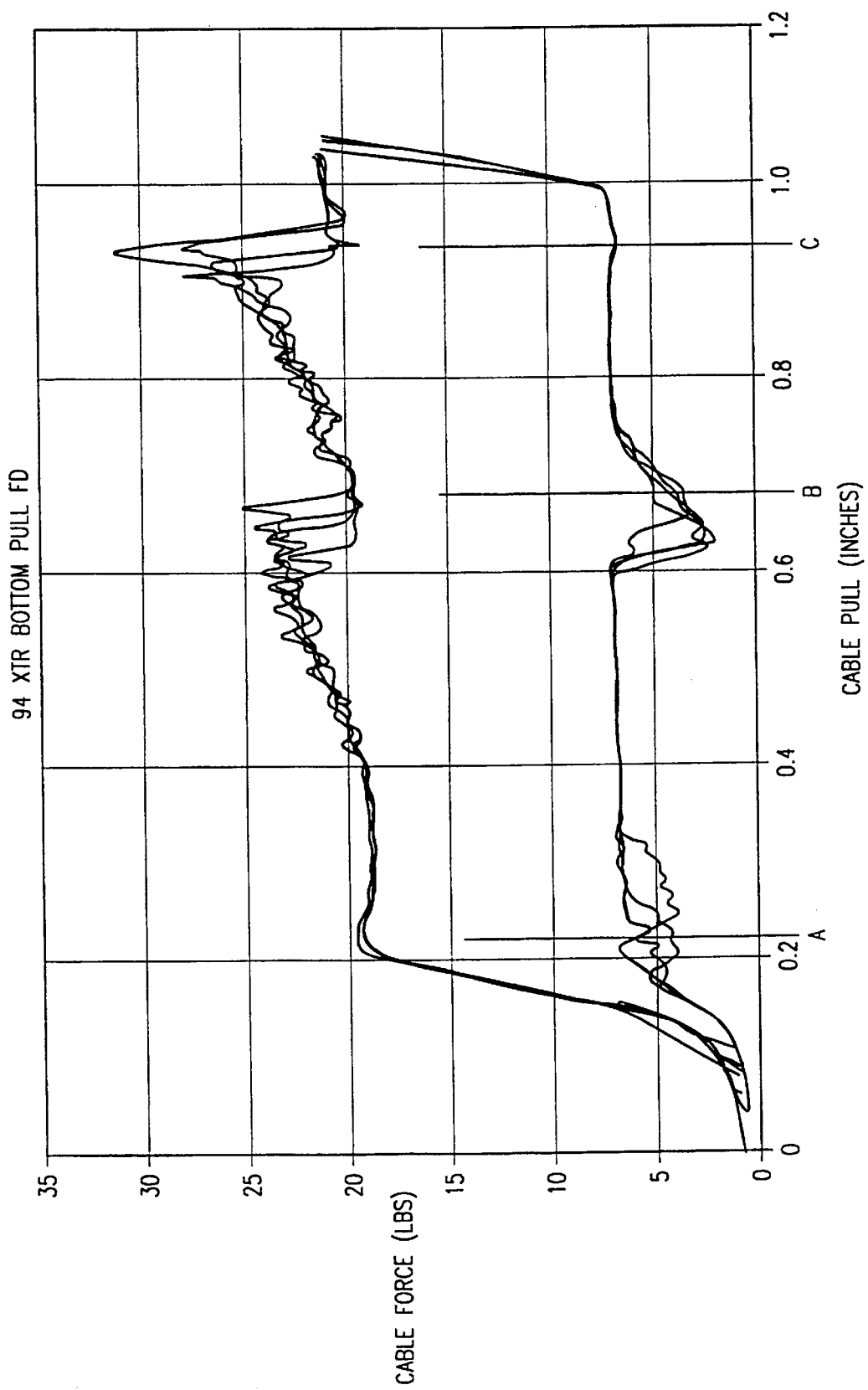
FIG. 7a is a graph of cable force versus cable pull for three different positions according to various embodiments of the inventions.

FIG. 3 is an isometric view of a conventional front derailleur. Referring to FIGS. 3 and 7, actuation of control cable 86 causes chain guide 80 to urge drive chain 48 among a plurality of chainrings 40, 41, 42. As noted above, the increased input torque typically required to shift the drive chain from the middle to large chainrings can be eliminated or substantially reduced by employing a varying mechanical advantage mechanism in the shifter or front derailleur. As the drive chain 48 (FIG. 7) moves from the middle chainring 41 to the large chainring 42 chainrings, it gets pinched between the chain guide 80 and the large chainring 42. This causes a spike (FIG. 7a) in the required shift force. The shifter of the invention is designed such that the increase in mechanical advantage occurs just before this spike.

Such a mechanism is depicted in the twistshifter of FIG. 2. In the noted shifter, cable end 87 is seated at the outboard end of elongated slot 16 at rotational position A. In this position, the drive chain 48 (FIG. 3) is positioned on the small chainring 40 (FIG. 7). At position B, and shortly thereafter at the point of incipient sliding, the cable end is seated at outer radius $R_0$ with the drive chain positioned on the middle chainring 41. Finally, as the cable end slides to smaller inner radius $R_1$ at rotational position C the drive chain is shifted to the large chainring. The smaller the perpendicular distance between the control cable and the axis of rotation, the higher the mechanical advantage of the shifter and in turn the lower the required input torque by the rider at the grip 12. When initiating a shift from the small to middle chainrings (position A to B), the cable end 87 remains at the outboard end of the slot during rotation of grip 12. When shifting from the middle to large chainrings, however, the cable end 87 abruptly slides radially inward from radius $R_0$ to radius $R_1$. The increased mechanical advantage derived from moving from radius $R_0$ to $R_1$ compensates for the increased effort needed to shift to the large chainring 42. Accordingly, the required input torque by the rider at the grip remains substantially uniform for the entire shift from the small to large chainrings.

In an additional embodiment of the invention as shown in FIG. 4, a sectional view which also corresponds to line 2—2 of FIG. 1, the position of the cable end 87 is shown for the full rotational sweep of the shifter from positions (a) through (d). As noted above, position (a) corresponds to a drive chain location on the small chainring and position (b) to a drive chain location on the middle chainring, during which the cable end 87 is located at outer radius $R_0$. Subsequently, during the chain displacement from the middle to large chainrings (position (b) to position (d)), the cable end slides along an elongated surface 88 to inner radius $R_1$. In a preferred version of this embodiment, the shifter is rotated approximately 40 degrees from positions (a) to (b). Incipient sliding occurs approximately 10 degrees beyond position (b) and final position (d) is reached upon further rotation of the shifter approximately 30 degrees.

In the shifter embodiment of FIG. 2, the centerline of slot 16 is substantially radial with respect to the axis of rotation. This is not, however, a necessary limitation of the present invention. In the preferred shifter embodiment of FIG. 4, the flat portion of sliding surface 88 is formed in a plane that is offset a distance e from the rotational axis to account for the diameter of the cable end 87. This offset allows the control cable 86 itself to abut to the mandrel 89 (a rotatable grooved surface over which the control cable 86 is draped) thereby maximizing the mechanical advantage increase. Therefore, as will be appreciated by one having ordinary skill in the art, the sliding surface 88 need not be substantially radial with respect to the rotational axis nor need the sliding surface be linear.

Figure 5:
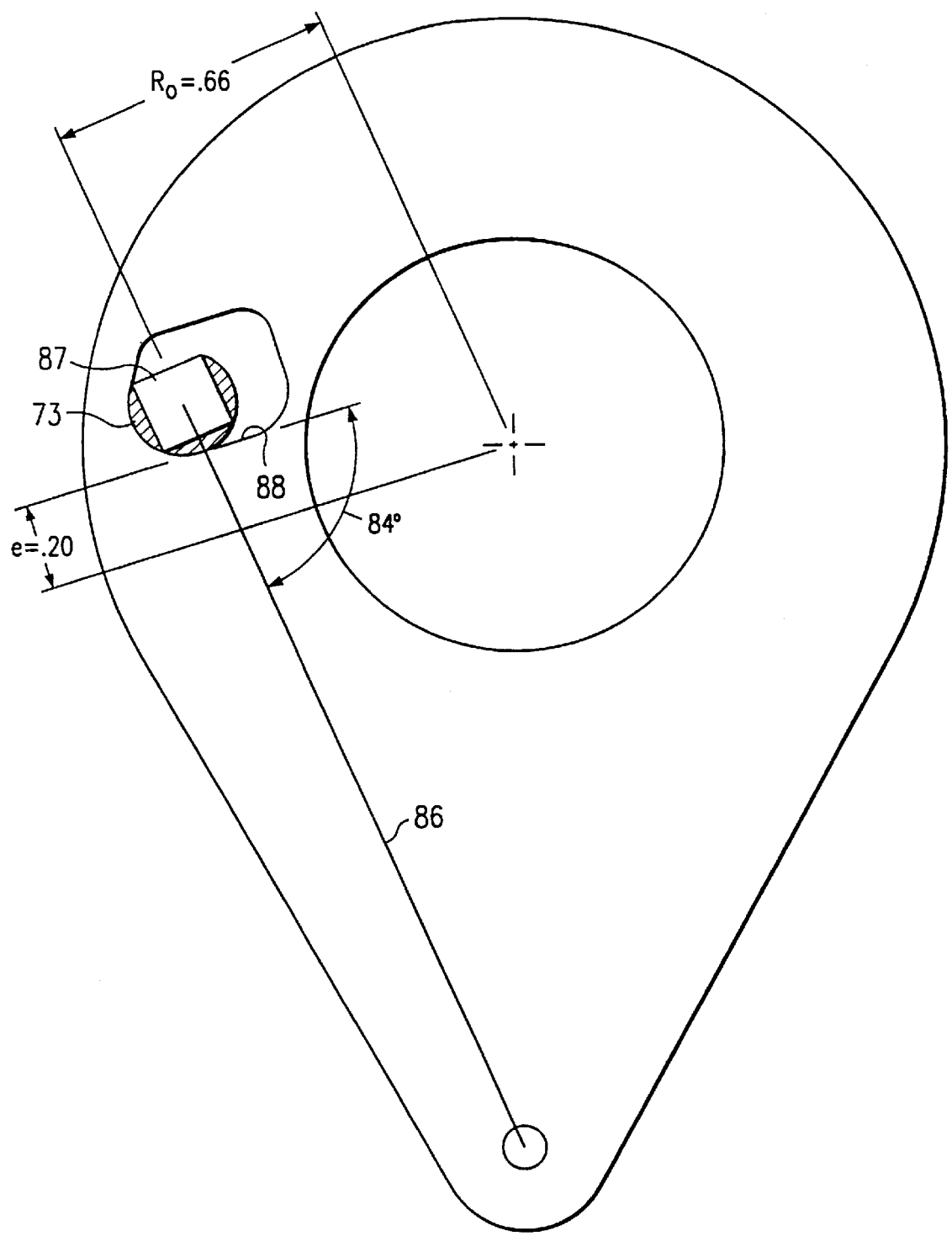
FIG. 5 is a sectional view of a second embodiment of a twistshifter according to the invention.

In a further embodiment of the invention as shown in FIG. 5, cable end 87 rides in a cradle 73, which in turn slides along surface 88, to reduce the sliding friction along surface 88. Cradle 73 is preferably made of acetal and takes a cylindrical shape. Furthermore, in said preferred embodiment, outer radius $r_0$ is approximately 0.66 inches and surface 88 is offset approximately 0.20 inches from the rotational axis and approximately 84 degrees from the control cable 86 at the point of incipient sliding.

Figure 6:
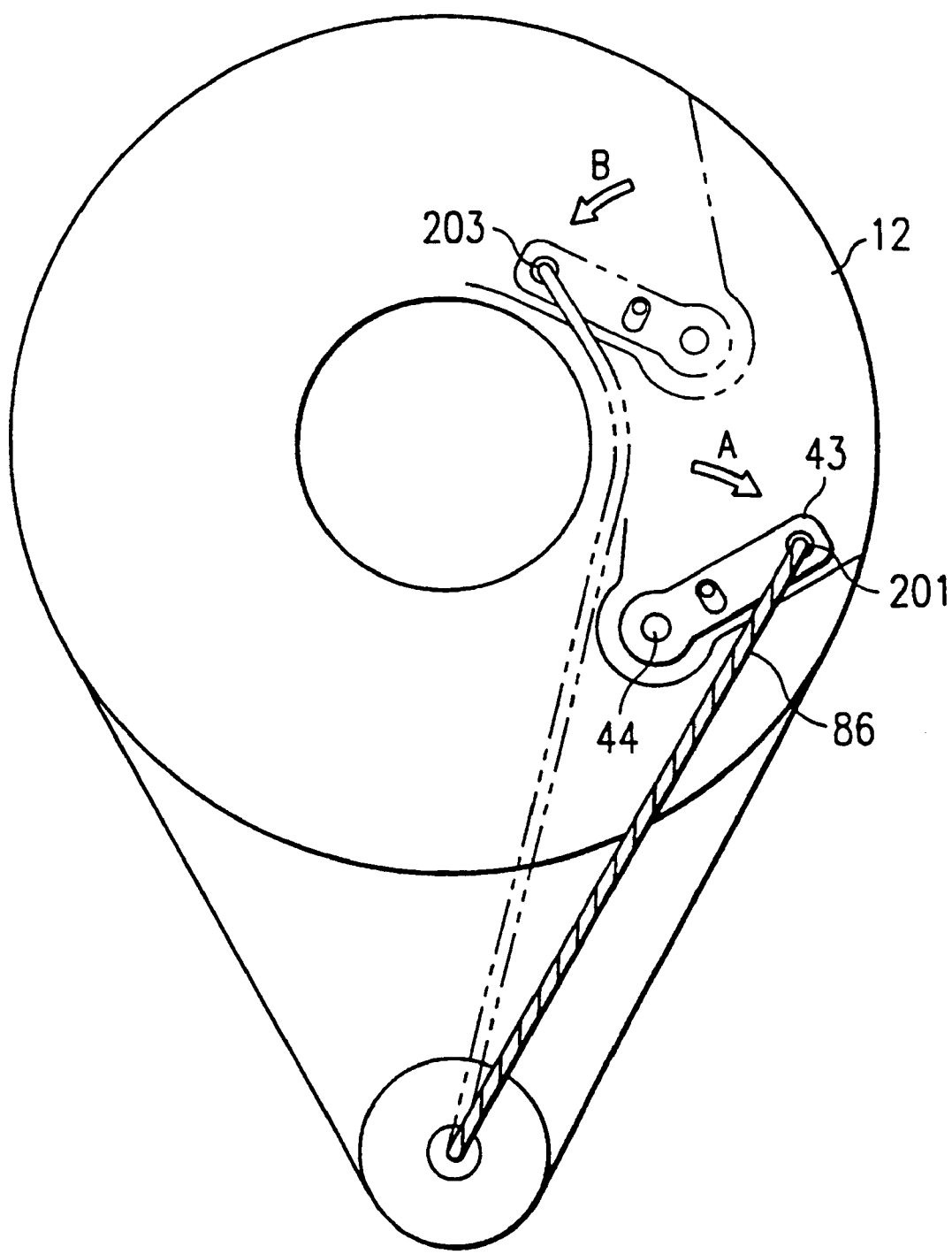
FIG. 6 is a sectional view of a third embodiment of a twistshifter according to the invention.

Referring to FIG. 6, there is shown an additional embodiment of the rotational shifter of the invention. The noted embodiment achieves like mechanical advantage benefits during front derailleur shifts from the middle to large chainrings but does so without employing a slotted mechanism. Instead, a column or toggle element 43 pivoting about hinge 44 (in turn connected to the handgrip member 12) "tilts" from position A to position B as the twistshifter is rotated thereby displacing the drive chain from the middle to large chainrings. At an end 201 opposite the hinge 44, an end 203 of the cable 86 is attached.

According to the invention, the discontinuous mechanical advantage actuation benefits can alternatively be achieved on the front derailleur itself. FIG. 7 is a forward view of a front derailleur incorporating a slot or channel 113 in a pivot arm or lever arm 114. The slot or channel 113 presents an elongated surface along which the cable end 87 may slide. Cable end 85, which may terminate in an enlarged bead, is slidably received in slot 113, the other cable end extending downward where it is routed along a cable guide located below the bicycle bottom bracket and redirected upward along the bicycle frame towards the shifter where the cable end is operatively connected thereto. Pivot 207 connects the pivot arm 114 to the remainder of the gear change mechanism, here a conventional derailleur parallelogram. In the noted device, actuation positions A, B and C correspond to the rotational actuation positions A, B and C in the twistshifter of FIG. 2. In FIG. 7, however, the high mechanical advantage position C occurs with cable end 85 at larger radius $r_2$, the reduced "leverage" position being at smaller radius $r_1$. The perpendicular offset of the cable 86 from the pivot axis 207 discontinuously decreases from position C to position A. The cable end 87 may reside within a curved cradle, similar to that shown in FIG. 5.

Figure 8:
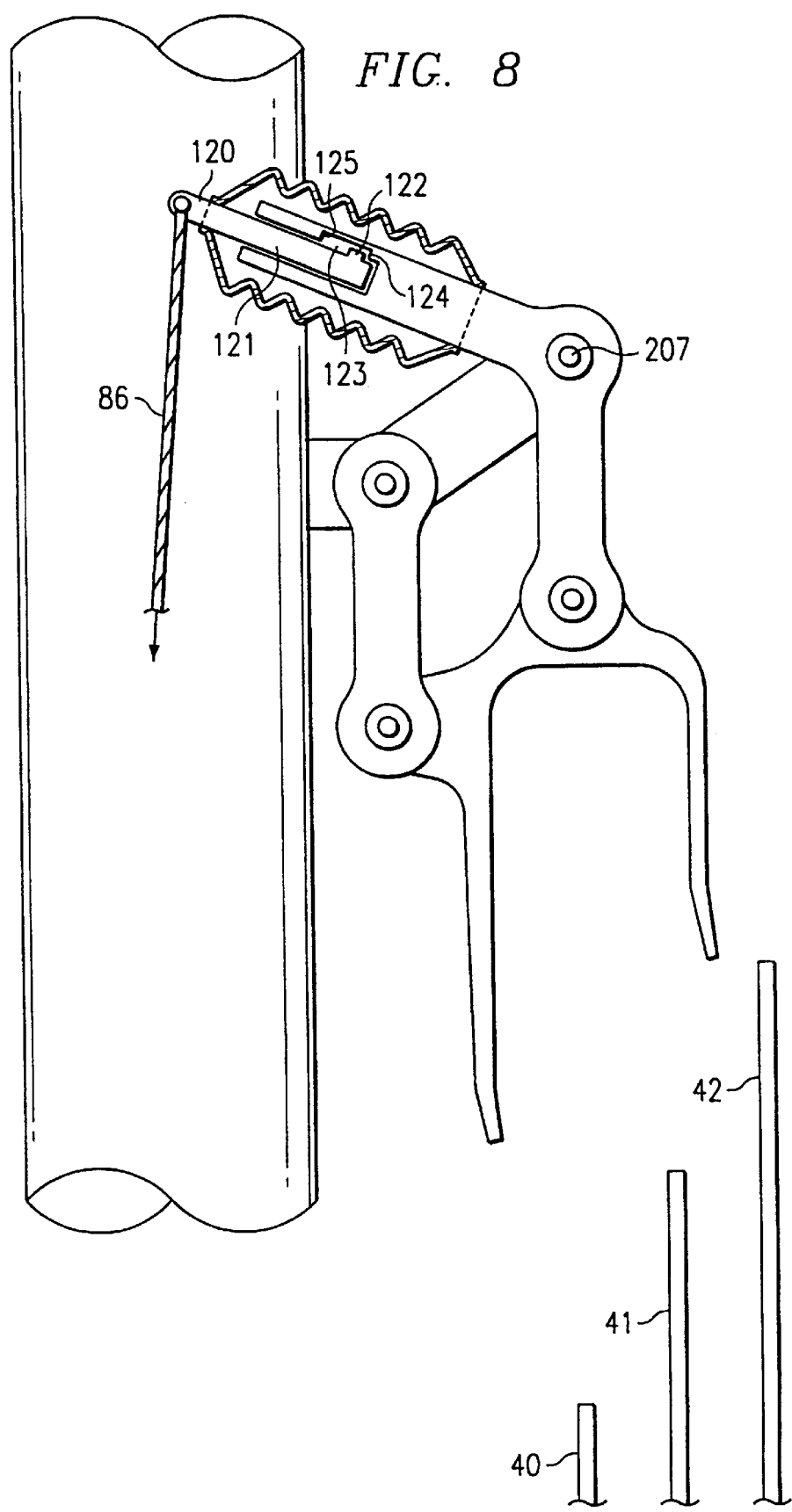
FIG. 8 is an elevational view of front derailleur according to a fifth embodiment of the invention.

In the additional front derailleur embodiment of FIG. 8, a sliding member or rod 120 displaces within bore 121 to achieve the discontinuous mechanical advantage during gear shifts, the walls of cavity 123 having mechanical stops to define the range of motion for the sliding member as peg or projection 122 abuts the cavity walls 124, 125. Cable end 87 is affixed to an outer end of the rod 120.

Figure 9:
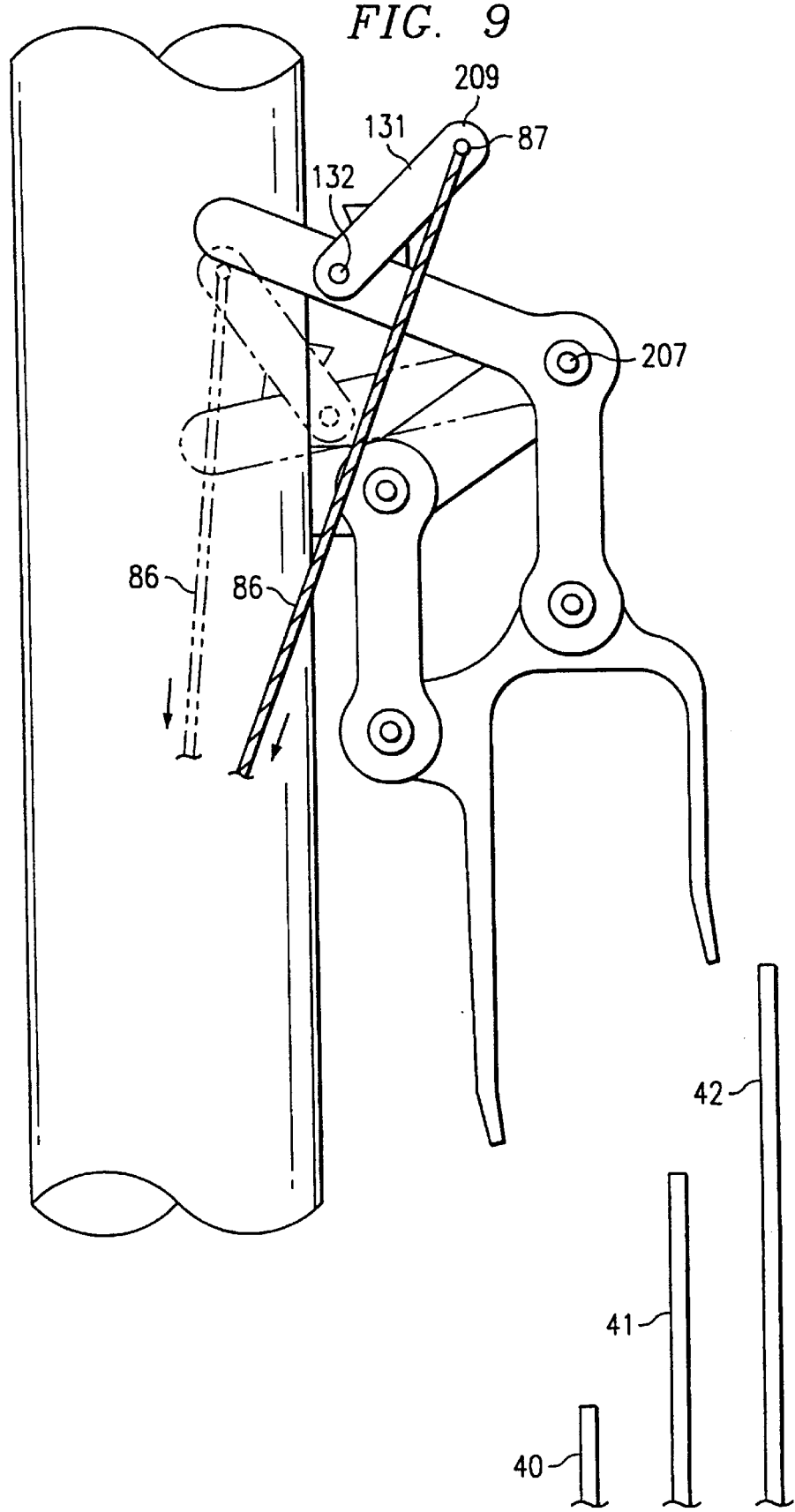
FIG. 9 is an elevational view of a front derailleur according to a sixth embodiment of the invention.

In the further front derailleur embodiment of FIG. 9, the "tilting" column mechanism of the shifter embodiment of FIG. 6 is adapted for use on the front derailleur, column or toggle element 131 pivoting about hinge point 132 to effect discontinuous mechanical advantage actuation. The cable end 87 is connected to an end 209 spaced from hinge point 132. The toggle element 131 is configured to be column loaded by the cable 86 to reciprocally deflect the cable end 87 away from axis 207. This will happen discontinuously when the cable 86 becomes parallel to the link 131; at that point, the element will "snap" from one position to the other.

As will be appreciated by one having ordinary skill in the art, the present invention is not limited to mountain bikes or triple chainring chainwheel configurations. The discontinuous mechanical advantage actuation system described above may be adapted to any shifting system including a plurality of chainrings.

While the form of apparatus herein described constitutes preferred embodiments of the invention, it should be understood that the invention is not limited to this practice form of apparatus, and that changes may be made therein without departing from the scope of the invention.

We claim:

1. A rotatable cable actuating mechanism mountable on a bicycle handlebar comprising:
   a housing secured relative to the handlebar;
   a handgrip member rotates about an axis of rotation substantially parallel to a handlebar axis; and
   a control cable having a first end extending through said housing and operatively connected to said handgrip member such that during a portion of the rotation of said handgrip member in a first direction a perpendicular offset of said cable from the axis of rotation will discontinuously decrease, and during at least a portion of the rotation of said handgrip member in a second direction the perpendicular offset of said cable from the axis of rotation will discontinuously increase.

2. A rotatable cable actuating mechanism according to claim 1, wherein the handgrip member axis of rotation is substantially coaxial to a handlebar axis.

3. A rotatable cable actuating mechanism according to claim 1, wherein the operative connection of the first cable end to said handgrip member comprises an elongated surface located in said handgrip member, said elongated surface configured to receive the first cable end and permit the first cable end to deflect toward and away from the axis of rotation in response to the rotation of said handgrip member.

4. A rotatable cable actuating mechanism according to claim 3, further comprising a cradle that receives the first cable end, said cradle reciprocally sliding along the elongated surface.

5. A rotatable cable actuating mechanism according to claim 2, wherein the operative connection of the first cable end to said handgrip member comprises a toggle element pivotally connected to said first cable end at a first end and pivotally connected to said handgrip member at a second end, said toggle element configured to be column loaded by the cable to reciprocally deflect the first cable end toward the axis of rotation in response to rotation of said handgrip member in a first direction and away from the axis of rotation in response to rotation of said handgrip member.

6. A bicycle gear shifting system comprising:
   a shift actuator rotatable about a first axis of rotation;
   a gear change device; and
   a control cable having a first end operatively connected to said shift actuator and a second end operatively connected to said gear change device such that during a portion of the rotation of said shift actuator in a first direction a perpendicular offset to said cable from the first axis of rotation will discontinuously decrease, and during a portion of the rotation of said shift actuator in a second direction the perpendicular offset of said cable from the first axis of rotation will discontinuously increase.

7. A bicycle gear shifting system according to claim 6 wherein said shift actuator further comprises:
   a housing secured relative to the handlebar; and
   a handgrip member rotatable about the first axis of rotation,
   the first end of said cable extending through said housing and being operatively connected to said rotatable member.

8. A bicycle gear shifting system comprising:
   a shift actuator rotatable about a first axis of rotation;

a gear change device rotatable about a second axis of rotation; and a control cable having a first end operatively connected to said shift actuator and a second end operatively connected to said gear change device such that during a portion of the rotation of said shift actuator in a first direction a perpendicular offset of said cable from the second axis of rotation will discontinuously increase, and during a portion of the rotation of said shift actuator in a second direction the perpendicular offset of said cable from the second axis of rotation will discontinuously decrease.

9. A bicycle gear shifting system according to claim 8, wherein the operative connection of the second cable end to said gear change device comprises an elongated surface located in said gear change device, said elongated surface configured to receive the second cable end and permit the second cable end to deflect toward and away from the second axis of rotation in response to the rotation of said shift actuator.

10. A bicycle gear shifting system according to claim 9, further comprising a cradle that receives the second cable end, said cradle reciprocally sliding along the elongated surface in response to the rotation of said shift actuator.

11. A bicycle gear shifting system according to claim 9, wherein the operative connection of the second cable end to said gear shift device comprises a toggle element connected to said first cable end at a first end and pivotally connected to said gear shift device at a second end, said toggle element configured to be column loaded by the cable to reciprocally deflect the second cable end away from said second axis of rotation in response to the rotation of said shift actuator in a first direction and toward the second axis of rotation in response to rotation of said shift actuator in a second direction.

12. A bicycle gear shifting system according to claim 9, wherein the operative connection of the second cable end to said gear shift device comprises an elongated sliding element connected to said first cable end at a first end and slidable connected to said gear shift device at a second end, said sliding element configured to reciprocally deflect the second cable end away from said second axis of rotation in response to the rotation of said shift actuator in a first direction and toward the second axis of rotation in response to rotation of said shift actuator in a second direction.

13. A method of gear shifting for a bicycle comprising the steps of:

operatively connecting a first end of a control cable to a shift actuator and operatively connecting a second end of a control cable to a gear change device;

rotating the shift actuator in a first direction about a first axis of rotation of induce a deflection of the gear change device in a first direction;

further rotating the shift actuator in the first direction while simultaneously discontinuously decreasing a perpendicular offset of the control cable from the first axis of rotation to induce the continued deflection of the gear change device in the first direction; and rotating the shift actuator in a second direction while simultaneously discontinuously increasing the perpendicular offset of the control cable from the first axis of rotation to induce deflection of the gear change device in a second direction.

14. A method of gear shifting for a bicycle comprising the steps of:

operatively connecting to a first end of a control cable to a shift actuator rotatable about a first axis of rotation and operatively connecting a second end of a control cable to a gear change device rotatable about a second axis of rotation;

rotating the shift actuator in a first direction about the first axis of rotation to induce a deflection of the gear change device in a first direction;

further rotating the shift actuator in the first direction while simultaneously discontinuously increasing a perpendicular offset of the control cable from the second axis of rotation to induce the continued deflection of the gear change device in the first direction; and rotating the shift actuator in a second direction while simultaneously discontinuously decreasing the perpendicular offset of the control cable from the second axis of rotation to induce deflection of the gear change device in a second direction.

15. A bicycle gear change device operable by the displacement of a control cable coupled thereto, the gear change device comprising:

a gear-changing mechanism selecting one of a plurality of gears of the bicycle; and a pivot arm rotatably coupled to the gear-changing mechanism about an axis, a force exerted by the pivot arm on the gear-changing mechanism responsive to displacement of the cable in a selected direction, the gear-changing mechanism selecting a particular one of the plurality of gears according to the angular position of the pivot arm, wherein during at least a portion of the rotation of the pivot arm in a first angular direction, a perpendicular distance between the cable and the axis will discontinuously decrease, and wherein during at least a portion of the rotation of the pivot arm in a second angular direction opposite the first angular direction, the perpendicular distance between the cable and the pivot arm will discontinuously increase.

16. The bicycle gear change device of claim 15, wherein an elongated channel is formed in the pivot arm having first and second ends, a sliding member slidable within the channel between the first end and the second end, an end of the control cable attached to the sliding member.

17. The bicycle gear change device of claim 15, wherein the gear-changing mechanism is a derailleur.

18. The bicycle gear change device of claim 15, wherein an elongate channel is formed in the pivot arm, the channel having first and second spaced-apart mechanical stops, the device further including a rod, a projection of the rod slidable in the channel between the first and second mechanical stops, an end of the control cable operatively affixed to the rod.

19. The bicycle gear change device of claim 15, wherein an elongate link has a first end articulably affixed to the pivot arm at a point spaced from the axis, a second end of the link opposite the first end operatively affixed to an end of the control cable.

20. The bicycle gear change device of claim 16, wherein the sliding member is formed by an enlarged bead formed on the end of the cable.

21. The bicycle gear change device of claim 17, wherein the axis is a pivot of a derailleur parallelogram.

22. The bicycle gear change device of claim 18, wherein the rod is elongate in a direction parallel to the channel, the projection formed on one end of the rod, the end of the control cable affixed to the rod at a point adjacent a second end of the rod spaced from the first end of the rod.

23. The bicycle gear change device of claim 18, wherein the channel is a bore in the pivot arm.

24. The bicycle gear change device of claim 19, wherein the elongate link is articulate between a first angular position relative to the pivot arm and a second angular position relative to the pivot arm, an angular orientation of the link with respect to the cable changing as the pivot arm pivots about the axis, the link actuated to change between the first angular position and the second angular position upon the cable being parallel to the link.

* * * * *